Oct. 27, 1964          R. P. CARTER ETAL          3,154,577
OPERATION OF CHEMICAL REACTIONS IN THE LIQUID PHASE
Filed May 29, 1958
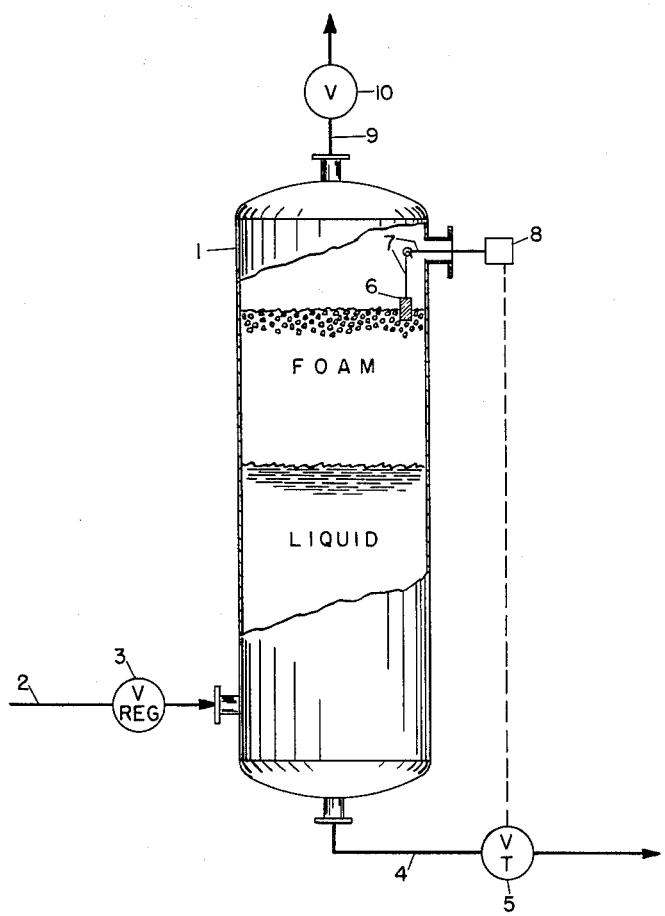
RICHARD P. CARTER,
FRANKLYN T. PARKINSON,
INVENTORS
BY  *Ernest G. Peterson*
AGENT.

United States Patent Office 3,154,577
Patented Oct. 27, 1964

3,154,577
OPERATION OF CHEMICAL REACTIONS IN
THE LIQUID PHASE
Richard P. Carter, Beverly, and Franklyn T. Parkinson,
Moorestown, N.J., assignors to Hercules Powder Company, Wilmington, Del., a corporation of Delaware
Filed May 29, 1958, Ser. No. 738,722
2 Claims. (Cl. 260—524)

The present invention relates to an improved method for the operation of liquid phase chemical reactions that have a tendency to produce foam.

The formation of foam has long been a problem in the operation of chemical reactions and the problem is particularly severe in conducting liquid phase chemical reactions characterized by the essentially continuous introduction of at least one reactant where the nature of the reaction is such that the volume of foam formed during the course of the reaction varies.

The nature of the difficulties encountered in the operation of such reactions can be understood from the realization that it has been past practice to conduct such reactions while maintaining a constant volume, or weight, of liquid reactant, or reactants, within the reactor. In such case it is necessary, of course, to either make provisions for handling the foam or to provide for the introduction of a chemical agent, i.e., anti-foam agent, that is capable of destroying or suppressing foam.

The first of the above alternatives, i.e., making provision for the handling of foam, can be attacked either by leaving a vacant space within the reactor for the formation of foam or by employing any of several different types of apparatus that have been designed for handling foam overflow. In either event, the solution to the problem is far from satisfactory. If space is left within the reactor for the formation of foam there is still no assurance that the volume of foam will not, on occasion, exceed the available space and overflow the reactor; conversely, the volume of foam will, on occasion, be much less than the space provided so that the full capacity of the reactor is not being used. On the other hand, attacking the problem by employing apparatus designed to handle foam overflow represents nothing more than the substitution of one disadvantage for another because the handling of excess foam is at best inconvenient and troublesome.

The second alternative, i.e., the injection of an anti-foam agent, has been employed successfully in some reactions but in other reactions such agents have been found ineffective or their presence has proved undesirable because of complications such as product contamination.

It is an objective of the present invention to provide an improved method whereby liquid phase chemical reactions which tend to produce a varying volume of foam can be conducted with the essentially continuous introduction of at least one reactant without the necessity of employing means to handle foam overflow or employing anti-foam agents, at full reactor capacity in relation to the volume of foam that is present. In accordance with the invention the improved method comprises decreasing the volume of reactants in the reactor in response to a rise in foam level and increasing the volume of reactants in the reactor in response to a decrease in foam level whereby approximately constant foam level is maintained.

The invention can be better understood by reference to the attached drawing in which 1 represents a reactor which is provided with a liquid inlet line 2, a liquid outlet line 4 and a gas vent line 9. Lines 2 and 9 are in turn provided with manually controlled valves 3 and 10, respectively, while line 4 is provided with an air operated throttle valve 5. Positioned internally near the top of the reactor is a float 6 which is suspended by arm 7, the movement of which actuates an externally positioned controller 8 which is pneumatically connected to the aforesaid throttle valve 5. Typical levels of foam and liquid within the reactor 1 are also shown.

In the operation of the apparatus of the drawing a liquid reactant (or reactants) is introduced at a controlled rate via line 2 until a predetermined volume of liquid has been introduced into the reactor. Reaction is then commenced and, in the normal course of events, a body of foam forms on top of the liquid and eventually the foam level reaches the position of the float 6. As the foam level tends to rise beyond this point, float 6 is raised and as the float rises its movement effects a change of position of arm 7 which in turn changes the air signal from controller 8. This change in turn opens throttle valve 5, thereby permitting the release of reaction product through line 4 at a rate greater than the input of reactant via line 2. This results in a decided decrease in the liquid level within the reactor and a smaller, corresponding decrease in foam level and as the foam level falls slightly, throttle valve 5 gradually closes to decrease the output of product. Thus, as the reaction proceeds, slight variations in the foam level cause throttle valve 5 to open and close partially, thereby varying the liquid level in the reactor as required to maintain an approximately constant foam level. Vent line 9 and valve 10 may be used, depending on the nature of reaction, to permit the escape of gases and vapors from the top of the reactor.

Although there are many reactions to which the invention is applicable, it will be described specifically in connection with the continuous oxidation of p-xylene to produce an oxidate containing toluic acid. In this specific illustration, a reactor, similar to that depicted in the drawing, having a cross-section of approximately 7 square feet and a total volume of about 130 cubic feet was employed. Initially, p-xylene containing a catalytic amount of cobalt toluate was charged to the reactor until the p-xylene occupied a volume of about 50 cubic feet. The contents of the reactor was then heated to approximately 140° C. under a pressure of 150 p.s.i.g. and air was then passed through the reaction mixture at the rate of 800 s.c.f.m. When the acid number of the reactor contents reached 200, the introduction of p-xylene and catalyst was commenced at the steady rate of 15 gallons per minute. As the reaction proceeded, foam formed on top of the liquid phase within the reactor, and as the foam level rose, the rise thereof actuated the internally positioned float which in turn actuated the throttle valve controlling the output of oxidate. Throughout the reaction as the volume of foam varied the output of oxidate varied from about 8 to about 12 gallons per minute while maintaining an approximately constant foam level over a period of 24 hours. At no time was there experienced any difficulty in foam overflow. The body of liquid within the reactor was estimated to have varied from about 50 cubic feet at the minimum to about 80 cubic feet at the maximum during the period of operation.

The illustrated oxidation of p-xylene is but one of many reactions to which the invention is applicable. In fact, any chemical reaction that is operated in the liquid phase and is characterized by the essentially continuous introduction of at least one reactant and wherein a varying volume of foam is produced can be practiced in accordance with the invention. Such reactions include, for example, the fermentation of alcoholic beverages; the alkylation of hydrocarbons; and the oxidation of hydrocarbons, aldehydes, ketones, and other compounds. The term "liquid phase" as employed herein is intended to include reactions in which at least one of the reactants exists in the form of a liquid under the reaction conditions and is not intended to exclude reactions in which one or more reactants are present as a gas, as in the case of oxygen in the foregoing example.

It is, of course, not essential to carry out the process of the invention exactly as it has been described in connection with the drawing or to employ an apparatus exactly as described. There are, in fact, many readily apparent modifications which may be made without departing from the scope of the invention. For instance, instead of a float, other mechanical or electrical devices sensitive to a change in foam level may be employed and instead of regulating the output of reaction product, the input of reactant(s) can be regulated to vary the liquid level. These, of course, are obvious modifications well within the skill of the art and thus need not be discussed in detail.

What we claim and desired to protect by Letters Patent is:

1. A method for operating a liquid phase chemical reaction within a reactor, which reaction is characterized by the essentially continuous introduction of at least one liquid reactant into the reactor and the essentially continuous withdrawal of liquid product, and by the formation of foam in varying volume within the reactor, which method comprises:

(a) positioning internally near the top of the reactor a device sensitive to a change in foam level;

(b) determining the rise and fall of foam level with said device; and (c) by means of a control system associated with said foam level device, decreasing the liquid level in response to a rise in foam level and increasing the liquid level in response to a decrease in foam level, thereby maintaining the foam level approximately constant, the change in liquid level in the reactor being based on control of the rate of product withdrawal.

2. The method of claim 1 wherein the chemical reaction is the continuous liquid phase oxidation of a xylene with an oxygen-containing gas.

References Cited in the file of this patent

UNITED STATES PATENTS

| | | |
|---|---|---|
| 511,540 | Morford et al. | Dec. 26, 1893 |
| 1,792,963 | Boye | Feb. 17, 1931 |
| 2,017,368 | Magner | Oct. 15, 1935 |
| 2,600,039 | Whaley | June 10, 1952 |
| 2,696,499 | Himel | Dec. 7, 1954 |
| 2,727,921 | Taves | Dec. 20, 1955 |
| 2,741,546 | Sweeney et al. | Apr. 10, 1956 |
| 2,788,367 | Bills et al. | Apr. 9, 1957 |
| 2,883,344 | McKinney | Apr. 21, 1959 |

OTHER REFERENCES

Chemical Engineers' Handbook, page 515 (1950), 3rd edition, McGraw-Hill Book Company, Inc.